No. 836,811.  
PATENTED NOV. 27, 1906.  
J. H. KENNEBREW.  
SPRING WHEEL.  
APPLICATION FILED FEB. 28, 1906.
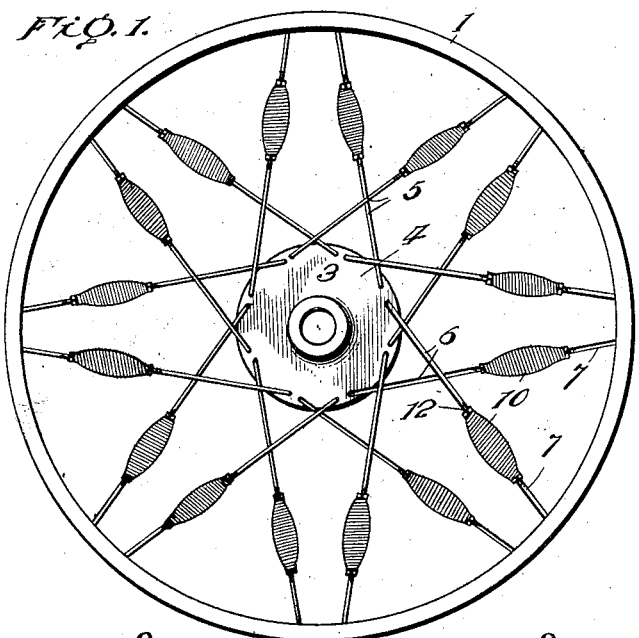
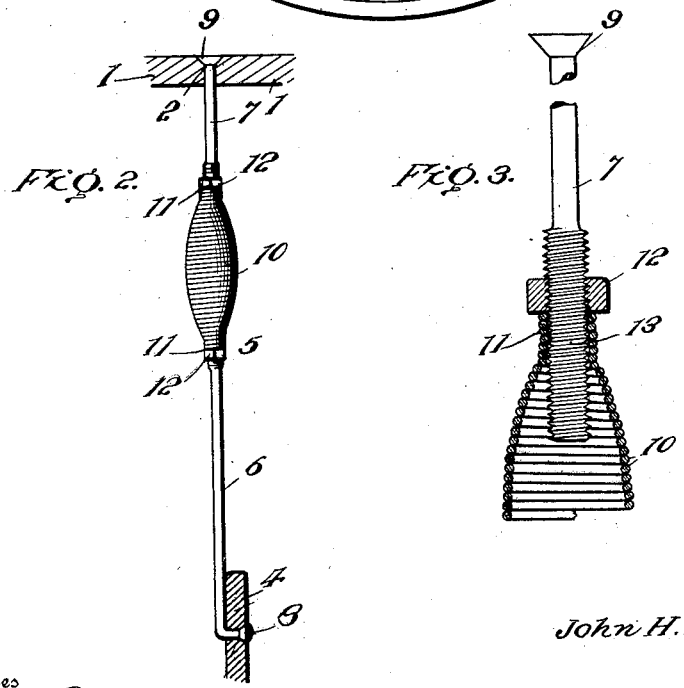
Inventor  
John H. Kennebrew,
Witnesses
By _____, Attorneys

UNITED STATES PATENT OFFICE.

JOHN H. KENNEBREW, OF COLUMBUS, MISSISSIPPI.

SPRING-WHEEL.

No. 836,811.  Specification of Letters Patent.  Patented Nov. 27, 1906.

Application filed February 28, 1906. Serial No. 303,511.

*To all whom it may concern:*

Be it known that I, JOHN H. KENNEBREW, a citizen of the United States, residing at Columbus, in the county of Lowndes and State of Mississippi, have invented certain new and useful Improvements in Spring-Wheels, of which the following is a specification.

This invention relates to an improved vehicle-wheel which is so designed as to do away with pneumatic tires and derive its elasticity from spring members forming a part of the spokes.

The object of the invention is to provide the spokes with springs which are connected thereto in such a manner as to enable the tension therein to be adjusted to the required amount and also to provide means for preventing the parts from working loose under the constant vibration incurred by the use of the wheel.

With these objects in view the invention consists, essentially, in forming the spokes in two sections, the said sections being adjustably connected by means of a spring member and being also provided with means for preventing the parts from working loose.

For a full description of the invention and the merits thereof and also to acquire a knowledge of the details of construction of the means for effecting the result reference is to be had to the following description and accompanying drawings, in which—

Figure 1 is a plan view of a wheel constructed in accordance with my invention. Fig. 2 is a side view of one of the spokes, and Fig. 3 is a detail view of the outer section of the spoke and a portion of the connecting-spring.

Corresponding and like parts are referred to in the following description and indicated in all the views of the drawings by the same reference characters.

The numeral 1 designates the felly or rim of the wheel, which may be of any suitable construction and is provided with a number of countersunk spoke-receiving openings 2, and 3 is the hub, which is preferably formed with an outwardly-extending flange 4 at each end thereof. The spokes 5, which connect the felly and the hub, are formed in two sections, the inner section 6 being connected to the hub, while the outer section is connected to the rim. For this purpose the inner section 6 has one end thereof bent at approximately right angles and provided with a knob 8, so as to engage with the openings in the flanges 4 in the usual manner. The outer sections 7 of the spokes are passed through the openings 2 in the felly 1 and are provided with heads 9, which fit in the countersunk portions of the openings and are so formed as to engage closely therewith when the spokes are in position. The two sections of the spokes are connected by means of coil-springs 10, which are so formed as to gradually decrease in cross-section toward the ends thereof, where they terminate in internally-threaded sleeves 11. The sleeves 11 at the opposite ends of the springs 10 are provided with right and left hand threads, respectively, and are adapted to coöperate with corresponding threads upon the adjacent ends of the spoke-sections. When thus constructed, it will be apparent that after the spoke-sections have been placed in position the spring member can be readily connected thereto and the required tension produced therein by grasping the spring member with the hand and turning it in the necessary direction. In order to prevent the spring-sections from working loose, jam-nuts 12 are located upon the threaded portions of the spoke-sections and are adapted to be turned into engagement with the sleeves 11, so as to effectively lock the same against turning.

In the practical construction of the spokes it is desirable that the threaded ends thereof be upset or given a slightly-enlarged cross-section, as seen at 13, in order that the threaded connection may not detract from the strength. While the spring members 10 may be of any suitable type, they are preferably of a helical formation and are larger at the middle portion than at the ends, so that the various portions thereof will be enabled to operate freely and will not interfere with each other.

While I have described the spokes as being employed in connection with a specific form of hub and felly, it will be understood that the main feature of the invention resides in the peculiar method of placing the spring members in the spokes and that they may be employed with equal facility in connection with any type of hub or felly.

Having thus described the invention, what is claimed as new is—

1. In a spring-wheel, the combination of a hub, a felly, spokes connecting the hub and felly and formed in two sections, the adjacent ends of the spoke-sections being enlarged, and provided with threads, spring members joining the spoke-sections and formed at their ends with internally-threaded sleeves which engage with the threaded ends of the spokes, and jam-nuts mounted upon the spokes and adapted to engage with the sleeves.

2. In a spring-wheel, the combination of a hub, a felly, spokes connecting the hub and felly and formed in two sections, the adjacent ends of the spoke-sections being enlarged and provided with threads, while the opposite end of the outer section passes through the felly and is provided with a head which engages with the opening therein, and the opposite end of the inner section is detachably connected to the hub, spring members joining the spoke-sections and provided at their opposite ends with internally-threaded sleeves which engage with the threaded ends of the spokes, the said springs being of a helical formation and tapering in cross-section toward the ends thereof, and jam-nuts mounted upon the spoke-sections and adapted to engage with the internally-threaded sleeves.

In testimony whereof I affix my signature in presence of two witnesses.

JOHN H. KENNEBREW. [L. S.]

Witnesses:
JAMES T. HARRISON, Jr.,
H. REEVES.